United States Patent Office 2,965,654
Patented Dec. 20, 1960

2,965,654
11-OXYGENATED-21-FLUORO-4-PREGNENE-3,20-DIONE

Clarence G. Bergstrom, Chicago, Ill., assignor to G. D. Searle & Co., Chicago, Ill., a corporation of Delaware No Drawing. Filed Aug. 15, 1956, Ser. No. 604,065

3 Claims. (Cl. 260—397.3)

This invention is concerned with hormonally-active steroidal compositions, and specifically, with compounds of the general structural formula

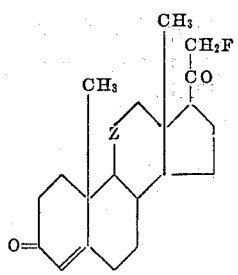

wherein Z can represent a β hydroxymethylene (CHOH) group or a carbonyl (CO) group.

A suitable starting material for the manufacture of the compositions of this invention is corticosterone (11β,21-dihydroxy-4-pregnene-3,20-dione). Upon treatment of this compound at room temperature with benzenesulfonyl chloride and collidine and separation of the steroidal reaction product, there is obtained 11β-hydroxy-21-chloro-4-pregnene-3,20-dione. This compound is then heated with an alkali metal iodide such as sodium iodide or potassium iodide in a lower alkanone such as acetone or butanone. When the crude 11β-hydroxy-21-iodo-4-pregnene-3,20-dione obtained in this reaction is heated under reflux with silver fluoride and acetonitrile, there occurs halogen replacement and 11β-hydroxy-21-fluoro-4-pregnene-3,20-dione is obtained. This compound is converted to 21-fluoro-4-pregnene-3,11,20-trione by treatment with an oxidizing reagent such as chromium trioxide in pyridine or chromium trioxide in acetic acid.

In an alternate process useful in the practice of this invention, dehydrocorticosterone (21-hydroxy-4-pregnene-3,11,20-trione) is treated at room temperature with benzenesulfonyl chloride and collidine, and the resulting crude 21-chloro-4-pregnene-3,11,20-trione is subject to halogen replacement by heating it under reflux with sodium iodide in butanone. When the resulting crude 21-iodo-4-pregnene-3,11,20-trione is subjected to a further halogen replacement by heating it under reflux with silver fluoride in acetonitrile, the compound obtained is 21-fluoro-4-pregnene-3,11,20-trione.

The compositions of the present invention are pharmacological agents useful in the treatment of hormonal imbalance. They are eosinopenic and anti-inflammatory agents, and can be employed to correct the hyperemia associated with inflammation of the iris. They also are useful in the regulation of carbohydrate and mineral metabolism. For example, 11β-hydroxy-21-fluoro-4-pregnene-3,20-dione resembles cortisone in promoting the deposition of liver glycogen.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

A mixture of 2 parts of corticosterone, 14 parts of benzenesulfonyl chloride and 1.3 parts of collidine is stirred for 22 hours at about 25° C. Ethyl acetate (45 parts) and benzene (900 parts) are added, and this mixture is poured on a chromatography column prepared from 100 parts of silica. After the column is washed with 900 parts of a 5 volume percent solution of ethyl acetate in benzene, elution with 1800 parts of a 50 volume percent solution of ethyl acetate in benzene followed by vaporization of the solvents affords crude, crystalline 11β-hydroxy-21-chloro-4-pregnene-3,20-dione, suitable for use in the following operation without further purification.

Example 2

The crude, crystalline 11β-hydroxy-21-chloro-4-pregnene-3,20-dione as obtained in Example 1 is dissolved in 80 parts of acetone. Sodium iodide (5 parts) is added; the mixture is heated to boiling and maintained under reflux for 2 hours, after which it is distilled almost to dryness under reduced pressure. The residue is partitioned between ethyl acetate and dilute sodium thiosulfate solution. The ethyl acetate phase is washed with several portions of water, dried over anhydrous sodium sulfate, filtered and concentrated to dryness under reduced pressure. The non-volatile residue, which consists substantially of crude 11β-hydroxy-21-iodo-4-pregnene-3,20-dione, is dissolved in 160 parts of anhydrous acetonitrile. Two parts of purified silver fluoride (obtained by extracting the commercial material in a continuous extractor with acetonitrile, discarding the portion which fails to dissolve, and recovering purified silver fluoride from the acetonitrile solution) is added, and the mixture is heated under reflux for 18 hours. The cooled reaction mixture is filtered from precipitated silver iodide and the filtrate is distilled to dryness under reduced pressure. The non-volatile residue is partitioned between ethyl acetate and water. The ethyl acetate phase is washed with several portions of water, dried over sodium sulfate, filtered and concentrated to dryness in a vacuumn. The solid residue is crystallized repeatedly from benzene and from methanol, whereby there is obtained 11β-hydroxy-21-fluoro-4-pregnene-3,20-dione which melts at about 215–218° C. and has a specific rotation of about +216° in dioxane solution. The structural formula is

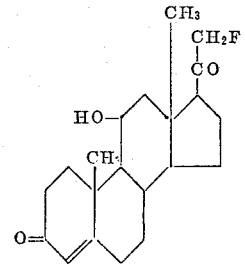

Example 3

To an oxidizing reagent prepared by adding, gradually and in small portions, a total of 2 parts of chromium trioxide to 100 parts of pyridine there is added, with stirring, 2 parts of 11β-hydroxy-21-fluoro-4-pregnene-3,20-dione. The reaction mixture is maintained at about 25° C. for 24 hours, with occasional shaking. It is then partitioned between 2000 parts of a 50 volume percent solution of benzene in ether and 500 parts of water. Insoluble matter is removed by filtration with the aid of diatomaceous earth, and the benzene-ether phase is separated from the filtrate, washed with several portions of water, dried over sodium sulfate, filtered and evaporated to dryness in a vacuum. A trace of pyridine is removed by adding 400 parts of toluene and distilling to dryness in a vacuum. By crystallization of the residue from methanol there is obtained 21-fluoro-4-pregnene-3,11,20-trione which melts at about 166–168° C. and has a specific rotation of about 295° in chloroform solution. The structural formula is

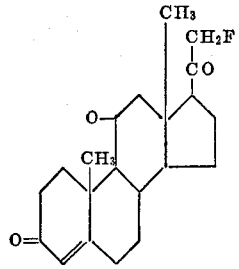

What is claimed is:
1. A compound of the structural formula

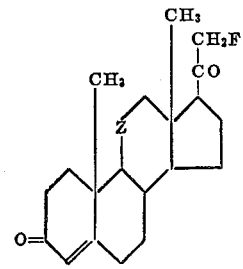

wherein Z is a member of the class consisting of β-hydroxymethylene and carbonyl groups.
2. 21-fluoro-4-pregnene-3,11,20-trione.
3. A compound represented by the formula:

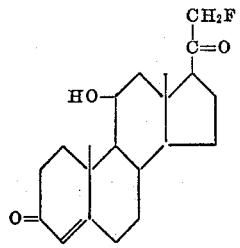

References Cited in the file of this patent
UNITED STATES PATENTS 2,684,968   Bergstrom _____ July 27, 1954
2,734,065   Hogg _____ Feb. 7, 1956

OTHER REFERENCES

Tannhauser et al.: J. Am. Chem. Soc., vol. 78, pages 2658–59 (June 5, 1956).